Patented May 14, 1935

2,001,255

UNITED STATES PATENT OFFICE 2,001,255

CONCENTRATION OF HORMONES IN SECRETIONS OF THE HUMAN OR ANIMAL BODY

Hedwig Langecker, Prague, Czechoslovakia, assignor to Schering-Kahlbaum A. G., Berlin, Germany No Drawing. Application October 21, 1931, Serial No. 570,261. In Germany October 27, 1930

9 Claims. (Cl. 167—74)

My invention relates to the accumulation or concentration of sexual hormones in fluid secretions of the human or animal body, such as urine.

Hitherto these secretions were extracted either in their natural state or after concentration or evaporation to dryness. However, this mode of concentrating the hormones is disadvantageous inasmuch as it is not advisable to expose the hormones to high temperatures. Apart therefrom these liquids, when being evaporated, more especially under reduced pressure, have a tendency to foam, which renders their evaporation difficult.

I have now discovered that if liquids of the kind mentioned above are saturated with a water-soluble salt of a mineral acid with an alkali or alkaline earth metal or ammonium, two different layers will form, the upper one having a very restricted volume, but containing almost all the hormones which were present in the starting material, so that one may say that the hormones have been salted out.

"Salting out" is a well-known phenomena and is produced by all highly soluble salts. It is defined by Perry (Chemical Engineer's Handbook, McGraw Hill Co. 1934, page 564) as follows:

When an electrolyte (salt) is added to an aqueous solution of a non-electrolyte, as hydrogen, ether, or succinic acid, the solubility of the latter is greatly diminished. The mutual solubility of two liquids such as ether and water is reduced by the addition of such a salt as sodium chloride or sodium sulfate. This phenomenon is called the "salting out effect."

In applying the discovery that hormones are susceptible to salting out to the accumulation or concentration of hormones in liquids of this kind, I have found it advisable to first acidify the liquids before adding the salt. Highly soluble salts, such as the alkali metal and ammonium sulfates, capable of producing a salting out effect are applicable in my invention.

The layer containing the hormone can be treated further in a well known manner for the recovery therefrom of the hormones themselves.

In practising my invention I may proceed for instance as follows:

Example 1

To 100 litres urine of pregnant women containing about 12000 mice units per litre of female cyclus hormone is added so much ammonium sulfate, that the liquid is saturated therewith. The liquor is allowed to stand over night in a cool room. On the following day the top layer (about 5-8 litres) can be separated off, this layer now containing about one million mice units. The hormone can be isolated therefrom in a well known manner.

Example 2

To 100 litres male urine is added acid sodium sulfate until saturation is attained. After standing over night an upper layer of acid reaction is formed, which contains almost all of the male sexual hormone, this layer measuring about 6-7 litres. The hormone can be recovered therefrom in a well known manner.

Example 3

To 100 litres male urine is added so much concentrated hydrochloric acid, that a clearly perceptible acid reaction is obtained with Congo-red. The liquor is now saturated with ammonium sulfate and allowed to stand in cool surroundings. The 5-6 litres separating out on top of the saturated sulfate solution contain the major part of the male sexual hormone, which can be isolated therefrom in a well known manner.

Various changes may be made in the details disclosed in the foregoing specification without departing from the invention or sacrificing the advantages thereof.

I claim:—

1. The method of concentrating sexual hormones in urine containing the same which comprises substantially saturating the urine with a highly soluble sulfate capable of producing a salting out effect, allowing the mixture to stand until separated into two layers and recovering the resulting supernatant layer of restricted volume containing substantially all the hormone in concentrated form.

2. The process of claim 1 wherein the urine is slightly acidified prior to saturation with said water soluble salt.

3. The method of concentrating sexual hormones in urine containing the same which comprises slightly acidifying the urine, substantially saturating the same with a highly soluble salt selected from a class consisting of the alkali metal and ammonium sulfates, allowing the mixture to stand until a supernatant layer of restricted volume is formed and recovering said supernatant layer containing substantially all the hormone in concentrated form.

4. The method of concentrating sexual hormones in urine containing the same which comprises slightly acidifying said urine, salting out said hormone by the addition of a salt selected from a class consisting of sodium and ammonium sulfates until it is substantially saturated, permitting the solution to stand and recovering a supernatant layer of restricted volume containing substantially all the hormone content of said urine.

5. The method of concentrating sexual hormones in urine containing the same which comprises acidifying said urine until about acid to Congo red, substantially saturating the same with a highly soluble sulfate capable of producing a salting out effect, allowing the solution to stand and recovering a supernatant layer of restricted volume containing the bulk of the hormone.

6. The process of claim 5 wherein the salt employed is ammonium sulfate.

7. The method of concentrating sexual hormones in urine containing the same which comprises substantially saturating the urine with a highly soluble salt capable of producing a salting out effect, allowing the mixture to stand until separated into two layers and recovering the resulting supernatant layer of restricted volume containing substantially all the hormone in concentrated form.

8. The method of concentrating sexual hormones in urine containing the same which comprises substantially saturating the urine with a highly soluble salt of a mineral acid with a base of the group consisting of the alkaline metals and ammonium, capable of producing a salting out effect, allowing the mixture to stand until separated into two layers and recovering the resulting supernatant layer of restricted volume containing substantially all the hormone in concentrated form.

9. In the method of concentrating sexual hormones from urine containing the same, the steps which comprise substantially saturating urine with a highly soluble salt capable of producing the salting out effect and recovering the sexual hormones thereby salted out.

HEDWIG LANGECKER.